(12) United States Patent
Oki

(10) Patent No.: US 7,538,918 B2
(45) Date of Patent: May 26, 2009

(54) TONER IMAGE FORMING APPARATUS INCLUDING GRADATION CONTROL

(75) Inventor: Makoto Oki, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 744 days.

(21) Appl. No.: 11/060,440

(22) Filed: Feb. 18, 2005

(65) Prior Publication Data

US 2005/0185203 A1    Aug. 25, 2005

(30) Foreign Application Priority Data

Feb. 23, 2004 (JP) .............................. 2004-047064

(51) Int. Cl.
*G03F 3/08* (2006.01)
*H04N 1/60* (2006.01)
*H04N 1/405* (2006.01)
*G06K 15/00* (2006.01)
*G03G 15/00* (2006.01)
*G03G 15/01* (2006.01)

(52) U.S. Cl. .................... 358/521; 358/1.9; 358/3.06; 358/3.1; 399/38; 399/39; 399/40; 399/41; 399/49; 399/72; 399/81; 399/82; 399/85; 399/87

(58) Field of Classification Search ..................... None
See application file for complete search history.

(56) References Cited

U.S. PATENT DOCUMENTS

| 6,330,083 | B1 * | 12/2001 | Nabeshima et al. | 358/474 |
| 2004/0056945 | A1 * | 3/2004 | Takamatsu et al. | 347/237 |
| 2004/0126124 | A1 * | 7/2004 | Inoue et al. | 399/44 |
| 2004/0136017 | A1 * | 7/2004 | Motoyama et al. | 358/1.9 |
| 2004/0145763 | A1 * | 7/2004 | Dougherty et al. | 358/1.13 |

* cited by examiner

*Primary Examiner*—Twyler L Haskins
*Assistant Examiner*—Barbara D Reinier
(74) *Attorney, Agent, or Firm*—Fitzpatrick, Cella, Harper & Scinto

(57) ABSTRACT

An image forming apparatus in which an image quality priority mode in which image density adjustment or image gradation control is effected to thereby give priority to the quality of an output image, and a speed priority mode in which gradation control is partly effected or is not effected to thereby output the output image within a short time can be selected by a user. A mode selection screen for selecting an image forming mode is displayed on the operating panel of the image forming apparatus. The image quality priority mode giving priority to the quality of image and the speed priority mode giving priority to speed are selectively displayed. When the user selects the image quality priority mode, and image control parameter is renewed immediately before image forming by image control, and the image forming is effected by the use of the renewed image control parameter, and when the speed priority mode is selected, at least part of the image control is not effected, but the image forming is effected.

7 Claims, 6 Drawing Sheets

TONER IMAGE FORMING APPARATUS INCLUDING GRADATION CONTROL

BACKGROUND OF THE INVENTION

1. Field of the Invention

The invention relates to an image forming apparatus such as a copying machine, a printer or a facsimile apparatus, and to the density control of an image formed by image forming means, and particularly to the gradation control of an image formed by image forming means.

2. Description of Related Art

Heretofore, in a color copying machine and printer of an electrophotographic type or the like, there have been effected various kinds of control which are not effected in a black-and-white copying machine and printer.

When a color image is to be formed, usually toner images of four colors, i.e., yellow, magenta, cyan and black, are individually formed, and these toner images are finally superimposed one upon another on a transfer material (e.g. paper or transparent film), and these toners are mixed together to thereby obtain a full-color image.

Therefore, the quality of image differs remarkably depending on the color balance of the toner images of the respective colors and the accuracy of the relative position thereof. Thus, various kinds of control are used to suppress the balance and positions of these colors.

For example, design is made so as to improve the quality of image by feed forward control for presetting developing contrast potential for obtaining an optimum developing characteristic on the basis of environmental information such as the temperature and humidity of the outside of an image forming apparatus, feedback control for actually forming a toner image (patch) on a photosensitive drum or the like, and detecting the density thereof to thereby self-diagnose a developing characteristic or the like and feed back it to an image control parameter, etc.

In the above-described feedback control, a patch and the like are actually formed, and they are detected to thereby renew the setting of an image control parameter (change the image forming conditions by image forming means). Accordingly, although depending on the method of control, a certain degree of time becomes necessary for the control itself. Therefore, heretofore, when a power supply switch is closed, and particularly when a fixing temperature is in a low state, feedback control such as patch detection has been effected during the time when a fixing device assumes a standby temperature (during warmup) so that a down time by the feedback control may not occur.

Likewise, besides the feedback control, in order to stabilize the potential of the photosensitive drum, the photosensitive drum is charged to thereby effect the uniformization of the potential.

Operations for image control and the stabilization of the photosensitive drum (preparatory steps before image forming) are generically called an initial sequence.

However, in an image forming apparatus which performs the initial sequence as described above during the warmup of the fixing device, there have arisen the following problems.

That is, in recent years, the warmup time has been shortened by an improvement in the fixing device, that is, it has become possible for the fixing device to reach a standby state within a short time, and it has become impossible to secure the time for performing the initial sequence. So, for example, during the time until the fixing device reaches the standby state, only the warmup of the fixing device or the control terminated within a very short time has been effected, and except it, the process of performing the initial sequence at the beginning of the first copying operation after the power supply switch has been closed, i.e., after a copy button has been depressed, has been carried out.

In the case as described above, however, the initial sequence is started after the copy button has been depressed and therefore, the time from after the copy button has been depressed until a transfer material after copying is discharged, i.e., the so-called FCOT (first copy out time, hereinafter referred to as the "first copy time"), becomes long.

Also, in a case where after the power supply switch has been closed, the initial sequence is performed in parallel with the warmup of the fixing device, the initial sequence is not terminated although the fixing device has reached a fixing possible temperature after the power supply switch has been closed and therefore, the time from after the power supply switch has been closed until the transfer material after copying is discharged (a time including the time in this case will hereinafter be called FCOT) becomes long, and a similar problem arises.

In the initial sequence, an image control parameter is renewed or corrected by the feedback control during a predetermined time (usually during the closing of the power supply switch or the like each time a predetermined number of sheets have been passed) and therefore, even if the initial sequence is not executed, the quality of image will not be remarkably deteriorated. With regard also to the stabilization of the potential of the photosensitive drum, there is no problem in character images, graphs, etc., and in such a case that continuous images are to be formed for light photographic images or the like which require delicate gradation reproduction, a delicate density difference only occurs in each page, and it is often the case that the difference cannot be found unless a page is checked against another. It has been found from the market researches hitherto made that usually few users require the strict control of the quality of image. Accordingly, the necessity of executing the initial sequence even by extending the first copy time is low.

Also, besides during the raising operation of the fixing device, there is also a similar problem in a case where gradation control is set so as to be effected at predetermined timing (after the standby is restored after the completion of a predetermined number of copies).

SUMMARY OF THE INVENTION

So, it is the object of the present invention to provide an image forming apparatus which, for a user having a high requirement for the quality of image, renews image forming conditions on the basis of the density information of a formed image immediately before image forming to thereby provide an image of high gradation reproducibility, and which, for a user having a wide tolerance to the quality of image, effects or does not effect gradation control within a short time to thereby be capable of outputting an image within a short time.

An image forming apparatus for achieving the above object has:

image forming means for forming an image on a recording material, the image forming means being capable of forming images for gradation control;

detecting means for detecting the density of the images for gradation control; and controlling means for causing the images for gradation control to be formed immediately before image forming, renewing an image forming condition on the basis of the result of detection for the formed images for gradation control by the detecting means, and causing an image to be formed on the basis of the renewed image forming condition to thereby control the gradation of the image formed by the image forming means, the controlling means being capable of executing a first control mode in which the total amount of the lengths of the images for gradation control formed in the direction of movement of the images for gradation control is greater than a predetermined value, and a second control mode in which the total amount of the lengths of the images for gradation control is smaller than in the first control mode;

wherein at least one of the first control mode and the second control mode can be selectively set; and the controlling means executes the set control mode.

Further, an image forming apparatus for achieving the above object has:

image forming means for forming an image on a recording material, the image forming means being capable of forming an image for gradation control;

detecting means for detecting the density of the image for gradation control; and controlling means for controlling the gradation of the image formed by the image forming means, the controlling means being capable of executing a first control mode in which it causes the image for gradation control to be formed immediately before image forming, renews an image forming condition on the basis of the result of detection for the image for gradation control by the detecting means, and causes the image forming to be effected on the basis of the renewed image forming condition, and a second control mode in which it does not cause the forming of the image for gradation control to be effected immediately before the image forming, wherein at least one of the first control mode and the second control mode can be selectively set, and the controlling means executes the set control mode.

DETAILED DESCRIPTION OF THE PREFERRED EMBODIMENTS

Figure 1:
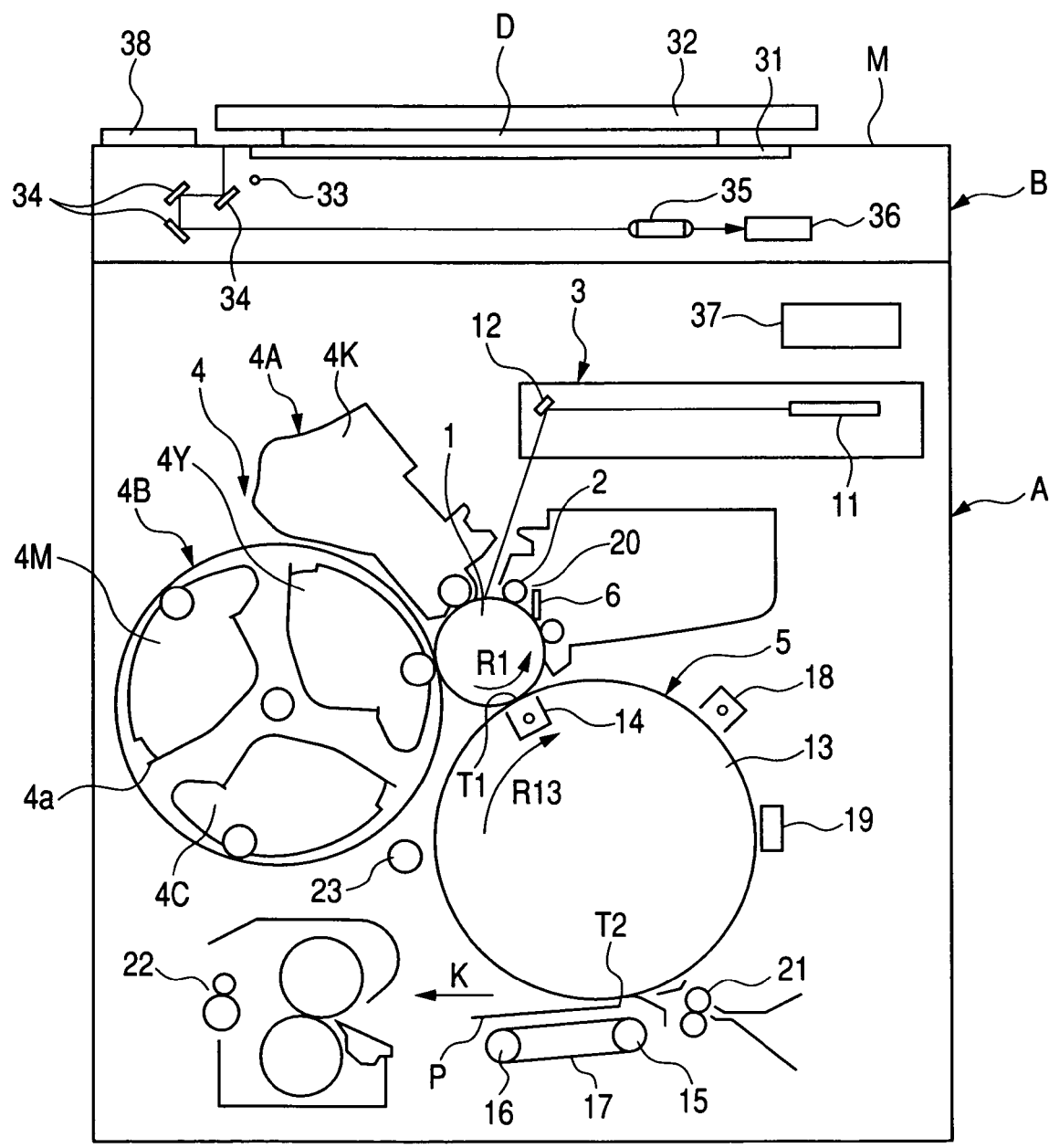
FIG. 1 schematically shows the construction of an image forming apparatus according to Embodiment 1.

Some embodiments of the present invention will hereinafter be described with reference to the drawings. In the drawings, what are given the same reference characters are the same in construction or function, and the duplex description of these will be suitably omitted.

Embodiment 1

FIG. 1 shows an image forming apparatus according to Embodiment 1 as an example of an image forming apparatus according to the present invention. The image forming apparatus shown in FIG. 1 is a four-color full-color copying machine (hereinafter referred to as the "image forming apparatus") of an electrophotographic type using an intermediate transfer member, and FIG. 1 schematically shows the construction thereof.

The epitome of the general construction and operation of the image forming apparatus will hereinafter be described with reference to FIG. 1.

The image forming apparatus shown in FIG. 1 is provided with a printer portion A for forming an image, and a reader portion B for reading the image of an original.

In the printer portion A, there is disposed a drum-shaped electrophotographic photosensitive member (hereinafter referred to as the "photosensitive drum") as an image bearing member. The photosensitive drum 1 is rotatably supported by an image forming apparatus main body M, and is adapted to be rotatively driven at a predetermined process speed (peripheral velocity) in the direction indicated by the arrow R1 by driving means (not shown).

Various process devices are disposed around the photosensitive drum 1. That is, around the photosensitive drum 1, there are disposed, substantially in succession along the direction of rotation of the photosensitive drum 1, a primary charging device (charging means) 2 for uniformly charging the surface of the photosensitive drum 1, an exposing device (exposing means) 3 for applying an optical image obtained by color-resolving a color image or an optical image corresponding thereto onto the photosensitive drum 1 after charged to thereby form an electrostatic latent image thereon, a developing device (developing means) 4 for developing the electrostatic latent image on the photosensitive drum 1 as a toner image, a transferring device (transferring means) 5 for transferring the toner image on the photosensitive drum 1, and a cleaning device (cleaning means) 6 for cleaning the surface of the photosensitive drum 1.

As the photosensitive drum 1, use is made, for example, of an OPC photosensitive member comprising an electrically conductive aluminum base and an organic photoconductor (OPC) photosensitive layer formed on the surface thereof.

The primary charging device 2 has a charging roller brought into contact with the surface of the photosensitive drum 1, and a charging bias applying voltage source (not shown) for applying a charging bias thereto.

The exposing device 3 has a laser transmitting device 11 ON/OFF-controlled in conformity with image information, and a reflecting mirror 12 for directing a transmitted laser beam to the surface of the photosensitive drum 1.

The developing device 4 is provided with a stationary type developing device 4A and a rotary type developing device 4B. The stationary type developing device 4A is constituted by a black developing device 4K in which a black developer is contained. Also, the rotary type developing device 4B is constituted by a rotatable rotary 4a and developing devices 4Y, 4M and 4C carried thereon and containing yellow (Y), magenta (M) and cyan (C) developers, respectively therein. This rotary type developing device 4B is designed such that by the rotation of the rotary 4a, the developing device of a color to be used for the developing of the electrostatic latent image on the photosensitive drum 1 is disposed at a developing portion (developing position) opposed to the surface of the photosensitive drum 1, and causes a toner to adhere to the electrostatic latent image to thereby develop it as a toner image.

The transferring device 5 has an intermediate transfer drum 13 as an intermediate transfer member which is an image bearing member, and a primary transfer charging device 14 disposed at a position on the intermediate transfer drum 13 which corresponds to the photosensitive drum 1. A primary transferring portion T1 is formed between the photosensitive drum 1 and the position on the intermediate transfer drum 13 which corresponds to the photosensitive drum 1. Also, a secondary transfer roller 15 is disposed below the intermediate transfer drum 13. A transfer belt 17 is passed over the secondary transfer roller 15 and a roller 16. A secondary transferring portion T2 is formed between the intermediate transfer drum 13 and the secondary transfer roller 15. Downstream of the primary transferring portion T1 and upstream of the secondary transferring portion T2 with respect to the direction of rotation (the direction indicated by the arrow R13) of the intermediate transfer drum 13, a charging device 18 for adjusting the potential of the toner image on the intermediate transfer drum 13 and a density detecting sensor 19 (e.g. a reflection type optical sensor) which is detecting means for detecting the density of the toner image on the intermediate transfer drum 13 are disposed so as to be opposed to the surface of the intermediate transfer drum 13. Also, downstream of the secondary transferring portion T2 and upstream of the primary transferring portion T1 with respect to the direction of rotation of the intermediate transfer drum 13, there is disposed a drum cleaner 23 for cleaning the surface of the intermediate transfer drum 13.

The cleaning device 6 has a cleaning blade 20 for removing residual toner not transferred to the intermediate transfer drum 13 during primary transfer, but residual on the surface of the photosensitive drum 1. The cleaning device 6 shown in FIG. 1, together with the above-described primary charging device 2, is made into a unit.

Upstream of the secondary transferring portion T2 with respect to the conveying direction (the direction indicated by the arrow K) of a transfer material P, which also serves as an image bearing member, there are disposed registration rollers 21 for supplying the transfer material P conveyed from a sheet supplying cassette (not shown) containing the transfer materials P therein to the secondary transferring portion T2 in such a manner as to time with the toner image on the intermediate transfer drum 13. Also, downstream of the secondary transferring portion T2 with respect to the conveying direction of the transfer material P, there is disposed a fixing apparatus (fixing means) 22 for heating and pressurizing the toner image on the transfer material P to thereby fix the toner image on the transfer material P.

The reader portion B has an original glass stand (a platen or an original plate) 31 on which a original D is placed, a presser plate 32 for pressing the original D against the original glass stand 31, a light source 33 for irradiating the original D, a reflecting mirror 34 for reflecting the light emitted from the light source 33 and reflected by the original D, a lens 35 for imaging the reflected light, and a CCD 36 on which the light from the lens 35 is incident. The light applied from the light source 33, reflected by the original D, reflected by the reflecting mirror 34, passed through the lens 35 and incident on the CCD 36 is adapted to be subjected to various kinds of image processing by an image processing portion 37. The reference numeral 38 in FIG. 1 designates an operating panel provided on the upper surface of the image forming apparatus main body M.

Figure 2:
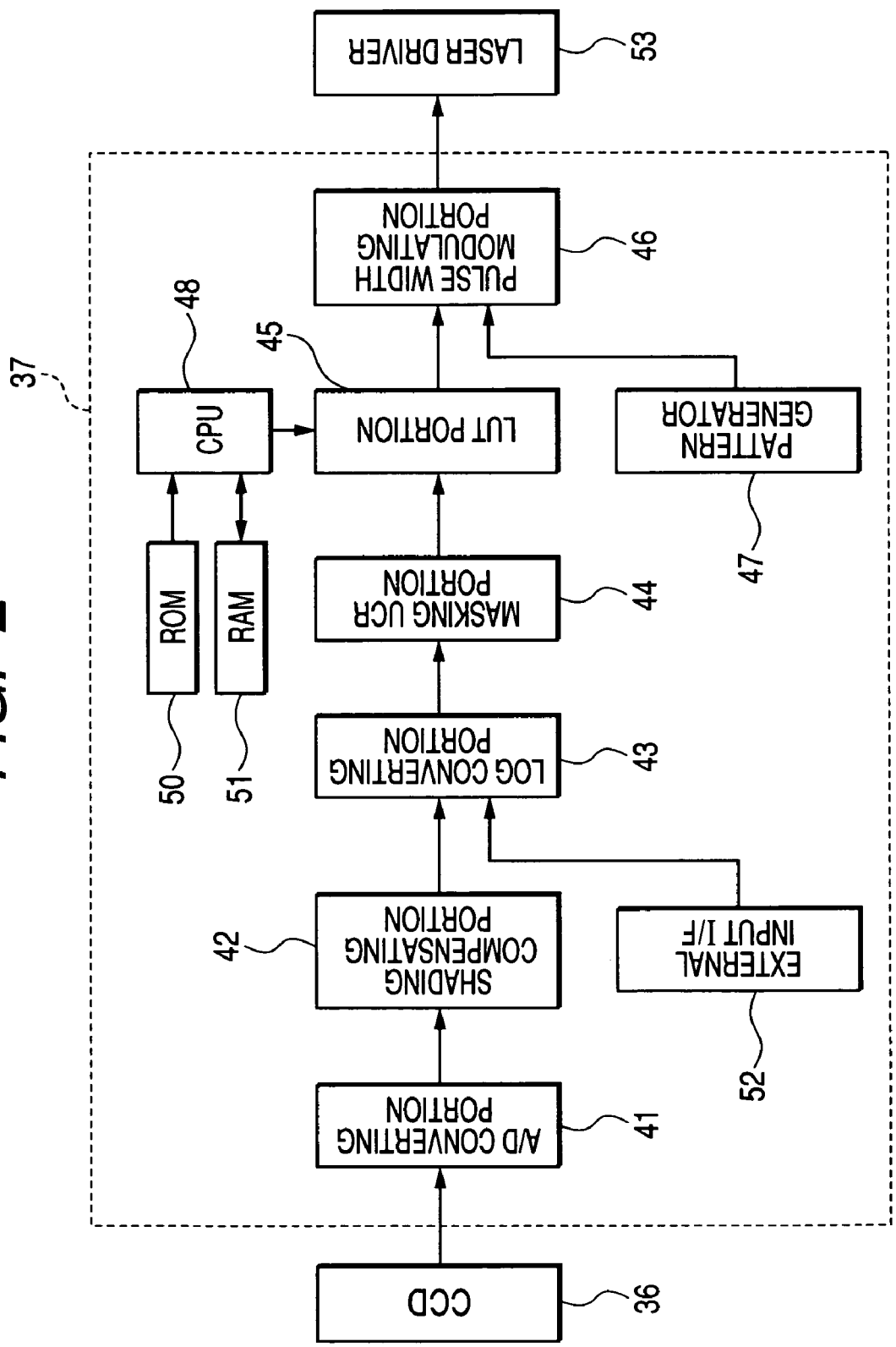
FIG. 2 is a block diagram showing the construction of an image processing portion in Embodiment 1.

FIG. 2 is a block diagram of the image processing portion 37. The image processing portion 37 has an A/D converting portion 41, a shading compensating portion 42, a LOG converting portion 43, a masking UCR portion 44, a look-up table (LUT) portion 45 and a pulse width modulating portion 46. A pattern generator 47 is connected to the pulse width modulating portion 46, a CPU 48 having a ROM 50 and a RAM 51 is connected to the LUT portion 45, and an external input I/F is connected to the LOG converting portion 43. Design is made such that an image signal outputted from the image processing portion 37 is inputted to the laser driver 53 of the exposing device 3, and the laser driver 53 ON/OFF-controls a laser transmitting device in accordance with the image signal.

The image forming operation of the image forming apparatus of the above-described construction will now be described briefly. The photosensitive drum 1 is rotatively driven at a predetermined process speed in the direction indicated by the arrow R1 by the driving means (not shown). The surface of the photosensitive drum 1 is uniformly charged to a predetermined polarity and predetermined potential by the primary charging device 2. From the surface of the photosensitive drum 1 after charged charges on the irradiated portion thereof are eliminated by the exposing of the exposing device 3 based on image information, whereby an electrostatic latent image is formed on the surface of the photosensitive drum 1. This electrostatic latent image is developed as a yellow toner image by the developing device 4Y of a first color (e.g. yellow). This toner image is primary-transferred to the intermediate transfer drum 13 at the primary transferring portion T1 by the primary charging device 14. The photosensitive drum 1 after the transfer of the toner image has any residual toner on its surface removed by the cleaning device 6, and is used for the forming of an image of the next color.

The above-described series of image forming processes, i.e., charging, exposing, developing, transferring (primary transferring) and cleaning, are also repeated for magenta, cyan and black which are the other three colors than yellow. Thereby, toner images of the four colors are superimposed one upon another on the intermediate transfer drum 13.

The toner images of the four colors on the intermediate transfer drum 13 arrive at the secondary transferring portion T2 by the rotation of the intermediate transfer drum 13. These toner images are collectively secondary-transferred to the transfer material P supplied to the secondary transferring portion T2 by the registration rollers 21, by the secondary transfer roller 15. From the intermediate transfer drum 13 after the transfer of the toner images, residual toners not transferred to the transfer material P but residual on the surface thereof are removed by the drum cleaner 23. On the other hand, the transfer material P after the transfer of the toner images is heated and pressurized by the fixing apparatus 22 and the toner images are fixed on the surface thereof, whereafter the transfer material P is discharged out of the machine (to the outside of the image forming apparatus main body M). Thereby, the formation of a four-color full-color image on a sheet of transfer material P is completed.

The image forming apparatus according to the present embodiment, in order to maintain the quality, particularly color taste and gradation, of a full-color image good, forms a gradation patch (a toner image for detection) which is an image for gradation control on the intermediate transfer drum 13, prepares a γ look-up table (renews the image forming condition) on the basis of the information thereof, and effects image forming on the basis thereof.

The control of the gradation patch for preparing the γ look-up table is effected as follows.

Eight gradation patches are formed for each color. The image signal level (0-255 level) of this patch forming is predetermined, and patch forming is effected on the basis of the image signal. The patches for each color are successively transferred to the intermediate transfer drum 13, and are detected by the density detecting sensor 19 after the last color has been transferred. The output voltage of the density detecting sensor 19 is outputted at 0-5V. The outputted voltage is A/D-converted so that density of 0-2.0 may become 10 bits (0-1023 level).

On the basis of this density information, a desired density gradation characteristic for each color is maintained by preparing the γ look-up table, thereby keeping the balance of the colors when the colors are mixed together.

In the image forming apparatus according to the present embodiment, the process speed of the photosensitive drum 1 is 117 mm/sec. Also, the diameter of the photosensitive drum 1 is 62 mm, and the diameter of the intermediate transfer drum 13 is 186 mm. The forming of the gradation patches requires seven full rotations of the intermediate transfer drum 13 in total, i.e., one full rotation of the intermediate transfer drum 13 for the processing (control) before the stabilization of the photosensitive drum 1 and the intermediate transfer drum 13, five full rotations of the intermediate transfer drum 13 for the forming and reading of the gradation patches, and one full rotation of the intermediate transfer drum 13 for post-processing such as the cleaning of the intermediate transfer drum 13, and the control time necessary at this time is 35 seconds.

By effecting this control, it is possible to confine the density of the image within a range of ±0.05 relative to the target density. On the other hand, when the control is not effected, an image is formed by the use of the γ look-up table renewed last time, whereby the density of the image is within a range of the order of ±0.20 at worst. The information of the γ look-up table renewed last time is stored in the RAM 51 as storing means (memory means), and the CPU 48 which is controlling means causes image forming to be executed by the use of the stored last γ look-up table.

In the present invention, the gradation control refers to forming a patch immediately before image forming, effecting the renewal of the γ look-up table on the basis of the formed patch, and forming an image by the use of the renewed γ look-up table.

Figure 3A:
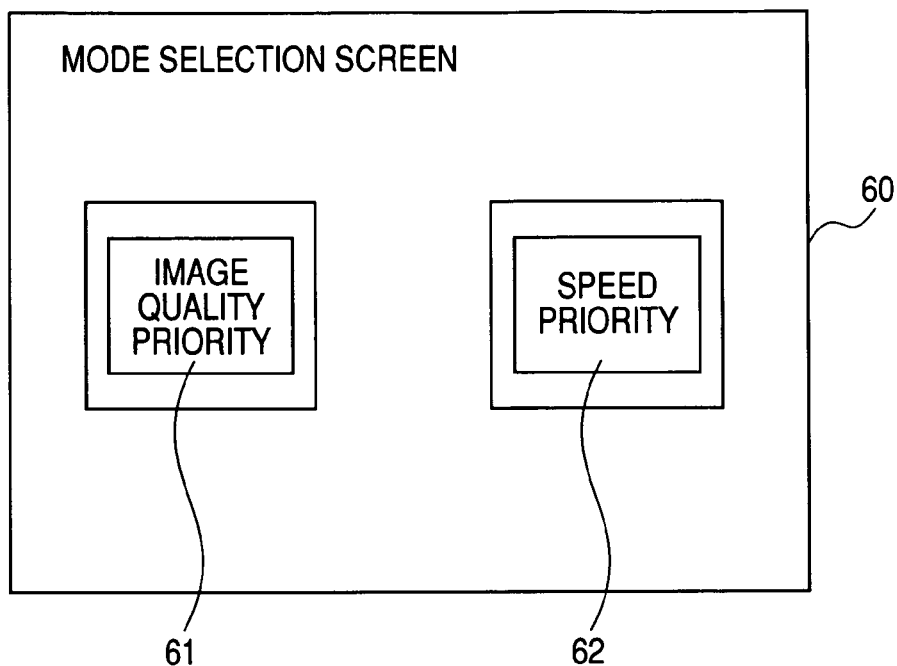
FIGS. 3A and 3B show a mode selection screen in Embodiment 1.

In the image forming apparatus shown in FIG. 1, as previously described, the operating panel 38 is provided on the upper surface of the image forming apparatus main body M, and design is made such that a mode selection screen 60 as shown in FIG. 3A for the user to select the mode of an image is displayed on this operating panel 38. Information set (selected) by this mode selection screen 60 is backed up as an input signal by the RAM 51 of FIG. 2, and is held even if the power supply of the image forming apparatus main body M is turned OFF/ON. On the basis of the information inputted to the RAM 51, the CPU 48, which is the controlling means, executes a control mode.

In the present embodiment, due to the time or the like required for the initial sequence (including the gradation control) performed before image forming after the power supply has been turned ON, the preparation time from after the power supply has been turned ON until image forming is started is longer than the standby time from after the main power supply of the image forming apparatus has been turned ON until the fixing means reaches a fixing possible temperature. Therefore, if the gradation control is executed, FCOT will become correspondingly longer.

Figure 3B:
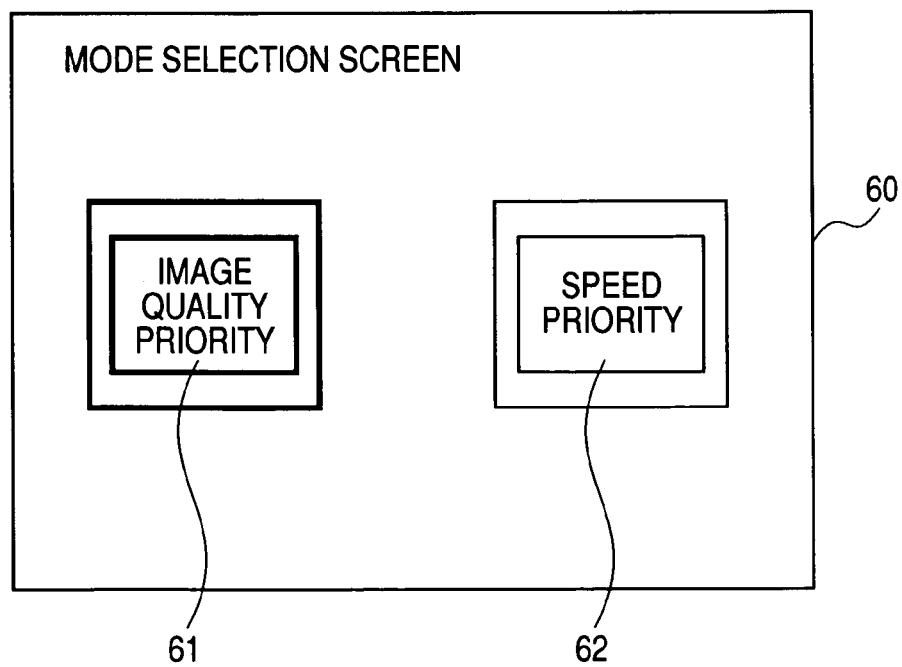
Figure 4:
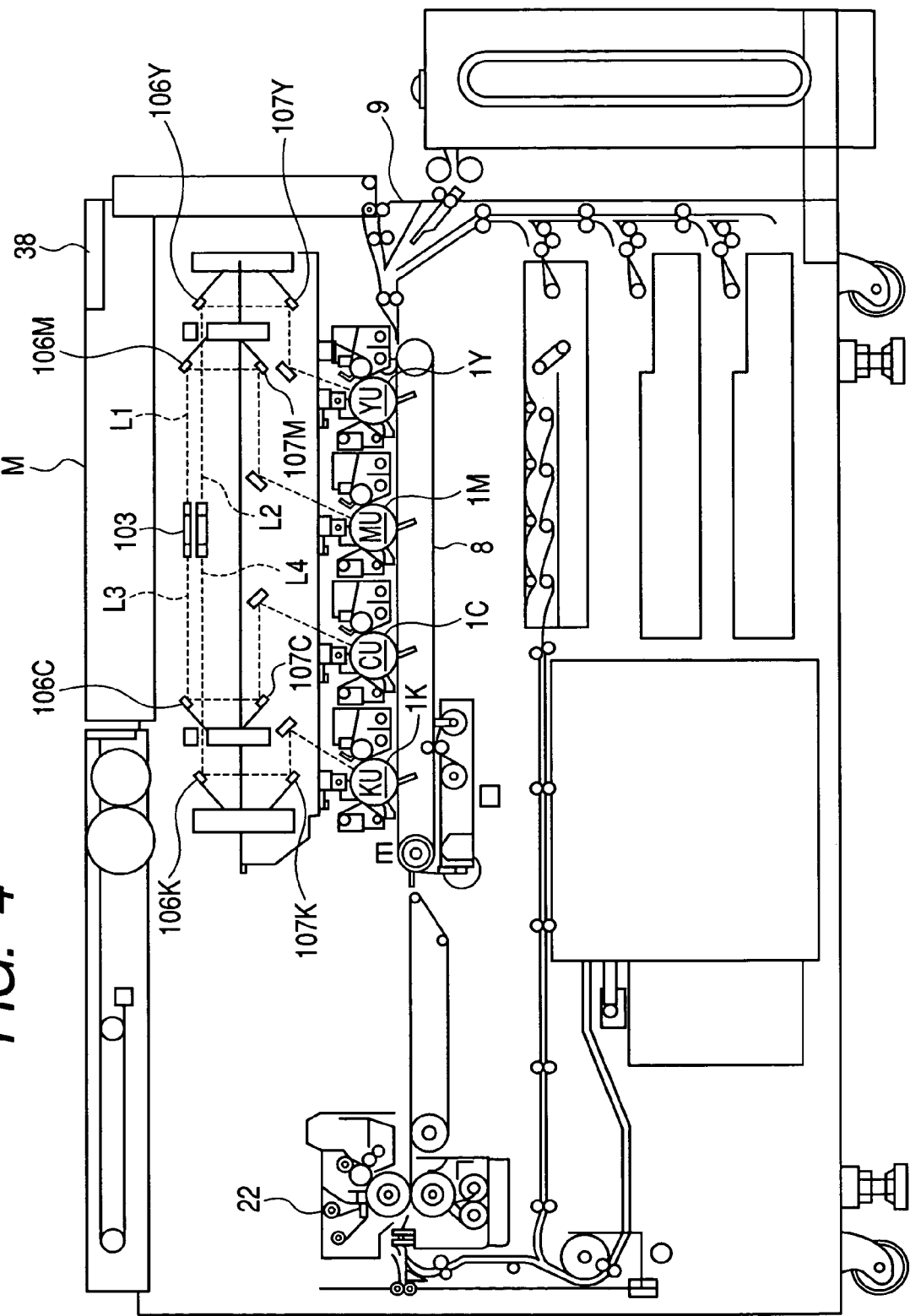
FIG. 4 schematically shows the construction of an image forming apparatus according to Embodiment 1.
Figure 5:
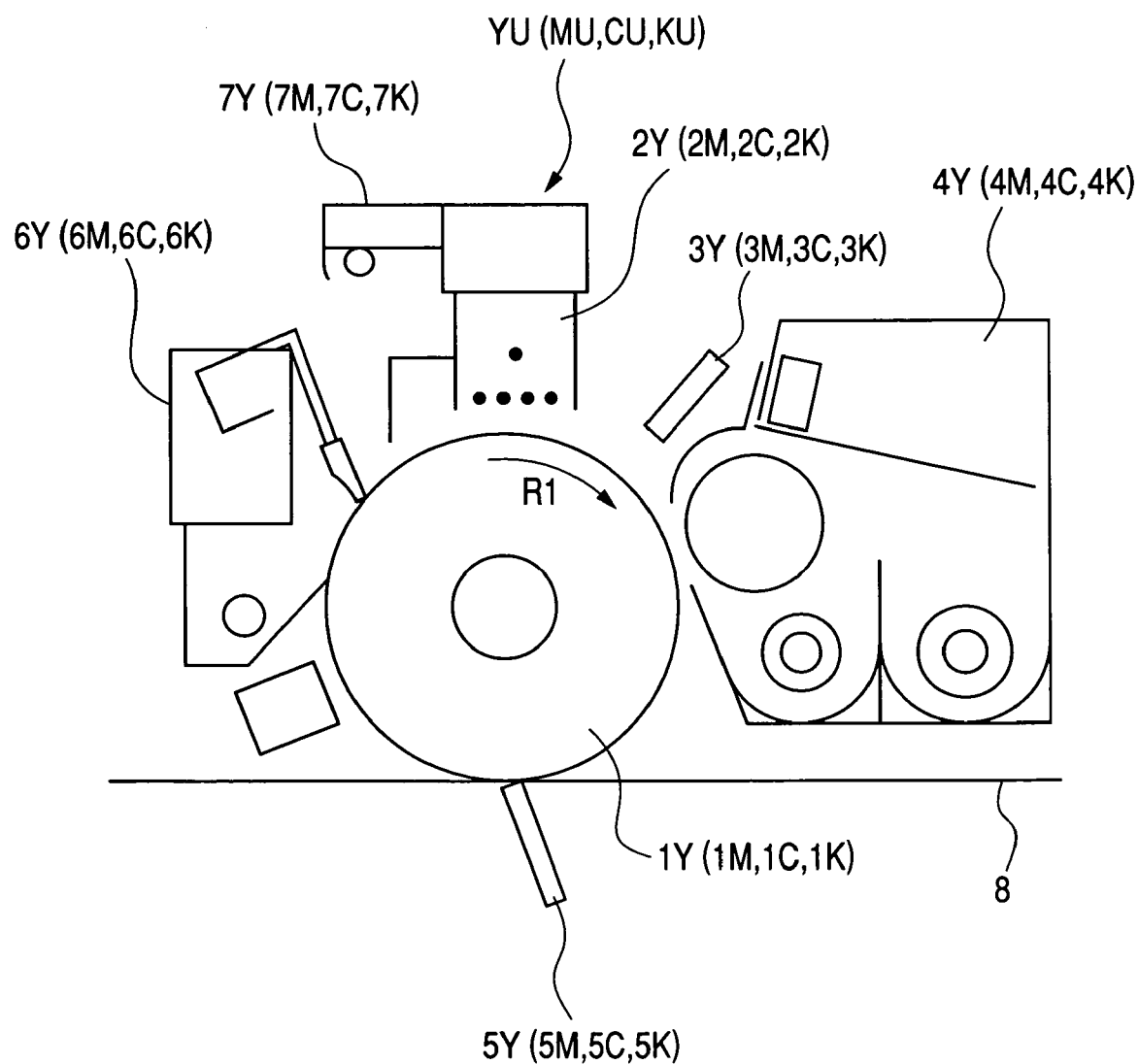
FIG. 5 is an enlarged view typically showing the construction of an image forming unit in Embodiment 1.

So, when as shown in FIG. 3B, an image quality priority mode (image quality priority 61) which is a first control mode is selected, the CPU causes the image forming means to form a gradation patch along with (simultaneously with) the ON of the main power supply of the image forming apparatus, and detects the density of the formed gradation patch by the use of the density detecting sensor, and the γ look-up table is renewed on the basis of the result of the detection. (Gradation control is effected.) Image forming is effected by the use of the renewed γ look-up table. Usually, the first copy time is 12 seconds, but in order to effect the gradation control, 35 seconds is added thereto. On the other hand, when a speed priority mode (speed priority 62) which is a second control mode is selected, the gradation control is not effected, but the first copy is outputted in 12 seconds which is an ordinary first copy time. By the speed priority mode being selected, the image forming time (the time from after a copy button has been depressed (an image forming start signal has been inputted) until the transfer material after copying is discharged) can be made shorter than in the image quality priority mode.

While in the present embodiment, the timing at which the gradation control is effected has been described with respect to a case where it is effected simultaneously with the ON of the main power supply of the image forming apparatus, this is not restrictive, but the gradation control may be effected after the image forming start signal is inputted to the image forming apparatus after the main power supply of the image forming apparatus has been turned ON. Again in this case, the warming-up time of the fixing device is shorter than the time from after the main power supply has been turned on until the preparation process (gradation control) before image forming is completed and therefore, if the gradation control is effected, FCOT will become long, but by the speed priority mode being selected, the time required for the gradation control becomes null and therefore, as compared with the quality of an image formed in the image quality priority mode, the image is inferior in the reproducibility of the shades of the colors, but FCOT can be shortened.

By making the user select the image mode in this manner, it becomes possible to cause a user requiring the gradation control to effect the setting the gradation control to effect the setting for executing the gradation control, and cause a user giving priority to the first copy time (the time from after a copying start signal has been received until a recording material on which an image has been formed is outputted, or the time from after the main power supply switch of the image forming apparatus has been turned ON until the recording material on which an image has been formed is outputted) to effect the setting for not executing the gradation control, and there can be provided an image forming apparatus which can provide an image of high quality to a user (or an output image) having a high requirement for the quality of image, and can effect an image output within a short time to a user (or an output image) having a wide tolerance for the quality of image.

While in the present embodiment, the density control of the gradation patch is effected on the intermediate transfer drum 13, design may be made such that the density control of the gradation patch is effected on the photosensitive drum 1 or on the transfer belt 17 or the like.

Also, it is possible to apply the present invention to an image forming apparatus which does not use an intermediate transfer member such as the intermediate transfer drum 13, for example, an image forming apparatus of a type in which the toner image formed on the photosensitive drum is directly transferred onto a transfer material, or a type in which the toner image formed on the photosensitive drum is transferred to a transfer material borne on the surface of a transfer drum. The detection of the density of the patch in this case may be effected on the photosensitive drum.

Also, while in the present invention, the case of an image forming apparatus having a single photosensitive drum 1 has been described as an example, the present invention is of course also applicable to an image forming apparatus provided with a plurality of image forming units each having a photosensitive drum, for example, an image forming apparatus provided with four image forming units for yellow, magenta, cyan and black. In this case, the density detection of the patch may be effected on the photosensitive drum 1, or the density control of the gradation patch may be effected on the transfer belt 17 or the like.

In the present embodiment, a case where the image mode is selected by the use of the operating panel 38 on the image forming apparatus main body M has been described as an example, but instead of this, in the case of such a construction that the operation of the image forming apparatus can be set on the operating screen of a personal computer, the image mode may be selected by the operating screen on the personal computer during image forming (during printing). In this case, input information selected (set) by the screen of the personal computer is stored as an input signal in a RAM as the storing means of the image forming apparatus, and the controlling means executes the image mode on the basis of the information stored in this RAM.

Also, while in the present embodiment, a case where in the image quality priority mode, the gradation control is effected and on the other hand, when the speed priority mode (speed priority 62) is selected, the gradation control is not effected has been described as an example, this is not restricted, but when for example, the speed priority mode is set, the number or length of patches formed immediately before image forming may be made small or short as compared with the image quality priority to thereby shorten the time required for the gradation control and shorten FCOT (or in the case of image quality priority, as compared with the speed priority, the length of the patch with respect to the direction of movement of the patch may be short, and in the case of a plurality of patches, the sum total of the lengths of the patches with respect to the direction of movement of the patches may be made short).

Here, in a case where the frequency of formation (the number of patches) of gradation patches for renewing the image forming conditions immediately before image forming, or the sum total of the lengths of the patches in the direction of movement thereof with respect to the direction of movement of the patches is changed by the control mode, in the case of image quality priority, the image signal level (0-255 level) which is the density level of the patch for gradation control is increased as compared with the speed priority mode, whereby the provision of an image of high quality good in gradation reproducibility, the image signal level (0-255 level) which is the density level of the patch for gradation can be decreased to thereby shorten the time required for gradation control, and shorten FCOT.

Also, while in the present embodiment, description has been made of a case where eight gradation patches are formed, the number of the patches is not restricted thereto.

In the present embodiment, when the density of the patches is to be detected by the density sensor, as the density sensor, use is made of a near-infrared LED as a light emitting element and a photodiode as a light receiving element, and regular reflected light from the toner image actualized on the intermediate transfer member is detected to thereby detect the density of the image. The image forming condition is changed by such density information of the toner image to thereby effect control. However, when a toner image particularly low in density level (the bearing amount of patches per unit area is small) is to be detected by the density sensor, there is a case where the S/N ratio of the output from the density sensor is small and the noise of the intermediate transfer member, which is the substrate on which the toner image is formed, is picked up. Therefore, to further improve detection accuracy, the length of the patches in the direction of movement thereof which is the scanning direction of the detecting means can be made great (the number of patches can be increased) to thereby improve the S/N ratio of the detecting means, effect more accurate density detection, and effect gradation control of high accuracy (high quality of image).

So, the frequency of forming of the patches of a predetermined density level may be made great for image quality priority as compared with speed priority. (The total sum of the lengths of the patches with respect to the direction of movement of the patches may be made great.) By doing thus, the density detection accuracy by the detecting means can be increased, and it becomes possible to provide an image of higher quality.

Also, while in the present embodiment in a case where gradation control is not effected when the speed priority mode is selected, an image has been formed by the use of the image forming condition of the look-up table renewed last time, this is not restrictive, but image forming may be effected under the image forming condition renewed at first when, for example, the main power supply of the image forming apparatus has been turned ON last time.

Also, it may be possible to select (set) a third mode besides the image quality priority mode and the speed priority mode, and in that case, at least the image quality priority mode and the speed priority mode can be even selected.

Also, while in the present embodiment, the speed priority mode or the image quality priority mode has been described with respect to the patches for the gradation control, this is not restrictive, but when the image quality priority mode is selected in a case where for example, patches are formed to control the maximum density value Dmax of the image forming apparatus to thereby control the image forming condition, the frequency of the patches used for the determination of Dmax may be increased, and in the speed priority mode, the frequency of the patches may be made small as compared with that in the image quality priority mode.

Also, when in order to prevent faulty cleaning occurring due to the toner serving as a lubricant in the portion of contact of the cleaning means being exhausted, the image quality priority mode is selected in a case where the toner (solid image) is supplied to the cleaning means (e.g. a cleaning blade) brought into contact with the image bearing member while the image is not transferred by the transferring means before image forming, the length of the solid image with respect to the direction of movement thereof may be made greater than a predetermined value, and in the speed priority mode, the length of the solid image to be supplied with respect to the direction of movement thereof may be made short as compared with that in the image quality priority mode.

Embodiment 2

The construction of an image forming apparatus according to this embodiment is the same as that of the aforedescribed Embodiment 1. The present embodiment differs from the aforedescribed Embodiment 1 in respect of a case where the speed priority mode has been selected.

In the present embodiment, when the speed priority mode is selected, gradation control is effected after the completion of image forming. By doing so, from the next job, use can be made of the γ look-up table renewed by the gradation control. In the speed priority mode in Embodiment 1, there has been deviation of the order of ±0.20 relative to the target density, but in the second and subsequent jobs in the present embodiment, the deviation can be suppressed ±0.05, and it never happens that the first copy time becomes long. For example, even when the power supply was started in the following morning, it has become possible to use the γ look-up table renewed on the preceding day (the last time) to thereby make the deviation equal to or less than +0.15 relative to the target density.

Embodiment 3

In this embodiment, a plurality of image forming modes differing in the image forming condition (the gradation characteristic of a desired γ look-up table) from one another can be set, and design is made such that either image quality priority or speed priority can be selected (set) in each of the plurality of image forming modes. By the plurality of image forming modes being thus set, an image forming condition (γ look-up table) corresponding to an output image can be set.

Figure 6:
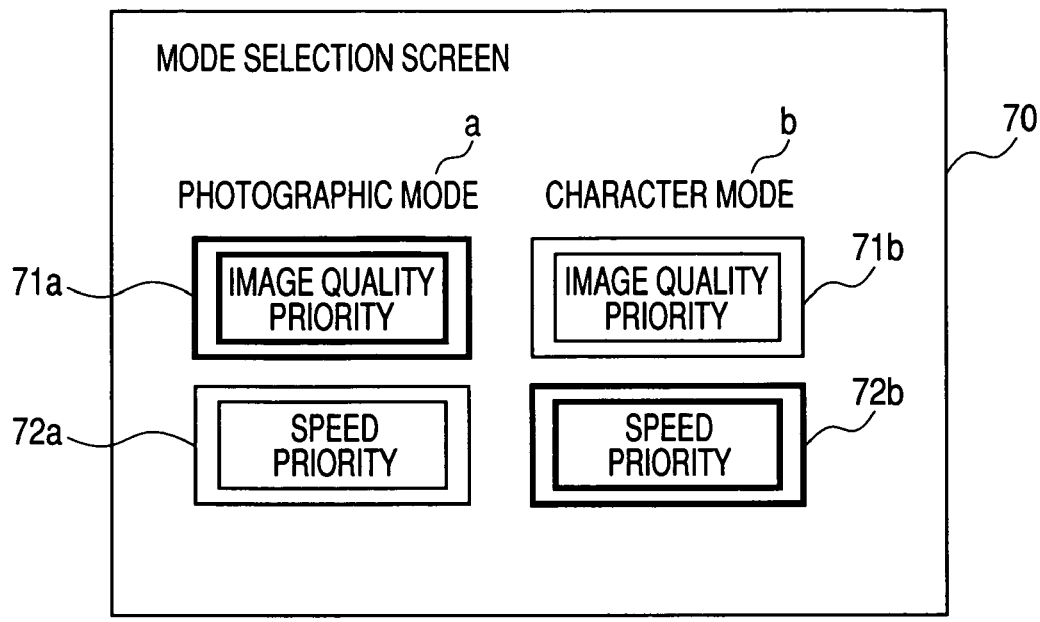
FIG. 6 shows a mode selection screen in Embodiment 3.

As shown, for example, in FIG. 6, design is made such that with respect to each of a case where the image forming mode is a photographic mode "a" and a case where the image forming mode is a character mode "b", either image quality or speed priority can be selected. Thereby, for example, in the photographic mode "a", image quality can be selected, and in the character mode "b", speed priority can be selected.

Here, the photographic mode is a mode in which when this mode is set and an image is outputted, the outputted image is formed by the use of a gradation characteristic more suitable for a photographic image. Also, the character mode is a mode in which when this mode is set and an image is outputted, the outputted image is gradation-controlled to a gradation characteristic more suitable for text data, and more suitable for a line image.

Figure 7:
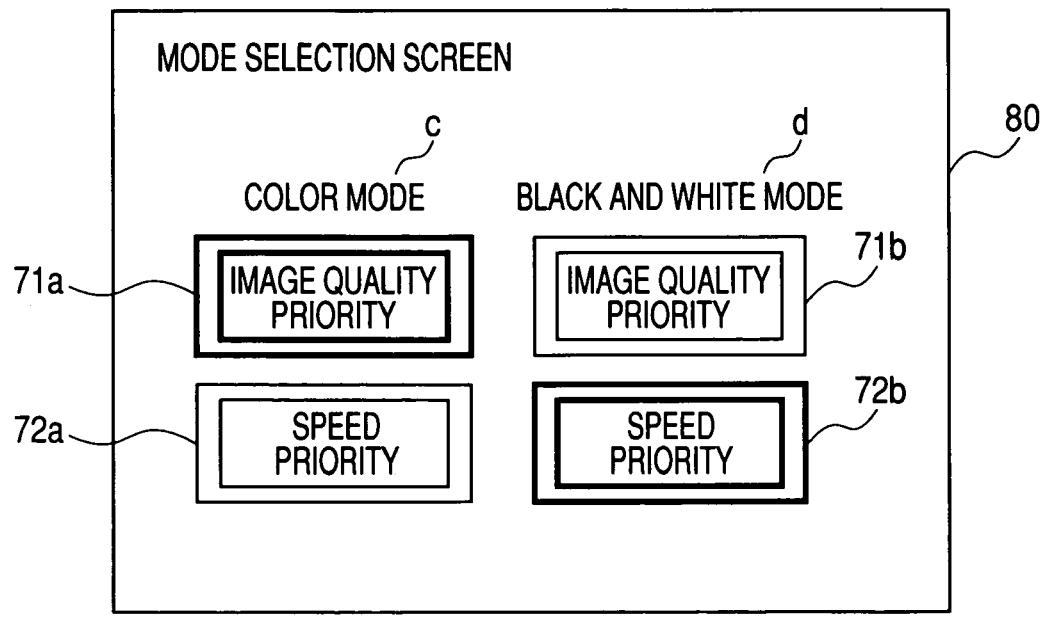
FIG. 7 shows a mode selection screen in Embodiment 3.

Also, as shown, for example, in FIG. 7, design is made such that with respect to each of a case where the image forming mode is a color mode "c" and a case where the image forming mode is a black-and-white mode "d", either image quality priority or speed priority can be selected. Thereby, for example, in the color mode "c", image quality priority can be selected, and in the black-and-white mode "d", speed priority can be selected.

Thus, it has become possible to select either speed priority or image quality priority in accordance with a plurality of image forming modes and therefore, either speed priority or image quality priority can be set in conformity with the image forming mode (the kind of an outputted image and the purpose of printing), and either speed priority or image quality priority can be set not only in accordance with the user, but also in accordance with the outputted image (mode), and the serviceability to the user can be more improved.

This application claims priority from Japanese Patent Application No. 2004-047064 filed on Feb. 23, 2004, which is hereby incorporated by reference herein.

What is claimed is:

1. An image forming apparatus comprising:
   a toner image forming device configured to form a toner image on a recording material;
   a detector configured to detect density of the toner image formed by said toner image forming device;
   a gradation control executing device configured to execute a gradation control in which an image forming condition is corrected by detecting density of a predetermined gradation pattern, formed by said toner image forming device, by said detector;
   an operating panel configured to permit designation by an operator of one of a plurality of modes including an image quality priority mode, in which a first toner image is formed under the image forming condition corrected by the gradation control after a main power switch is turned on, and a speed priority mode, in which the first toner image is formed under a predetermined image forming condition without executing the gradation control after the main power switch is turned on; and
   a controller configured to control said toner image forming device based on the designated mode.

2. An apparatus according to claim 1, wherein said operating panel includes a key for designating a color mode in which a color image is formed and a key for designating a black-and-white mode in which a black-and-white image is formed, and said operating panel permits the operator to select between the image quality priority mode and the speed priority mode regardless of whether the color mode or the black-and-white mode is selected.

3. An apparatus according to claim 1, wherein said toner image forming device includes a photosensitive member, a charging device configured to electrically charge said photosensitive member, an exposure device configured to expose said photosensitive member charged by said charging device, and a developing device configured to develop an electrostatic image on said photosensitive member, and wherein said detector detects density of the gradation pattern formed on said photosensitive member.

4. An apparatus according to claim 1, wherein said toner image forming device includes a photosensitive member, a charging device configured to electrically charge said photosensitive member, an exposure device configured to expose said photosensitive member charged by said charging device, a developing device configured to develop an electrostatic image on said photosensitive member, and an intermediate transfer member configured so that the toner image is transferred from said photosensitive member to said intermediate transfer member and then the toner image is transferred from said intermediate transfer member to the recording material, and wherein said detector detects density of the gradation pattern formed on said intermediate transfer member.

5. An image forming apparatus comprising:
   a toner image forming device configured to form a toner image on a recording material;
   a detector configured to detect density of the toner image formed by said toner image forming device;
   a gradation control executing device configured to execute a gradation control in which an image forming condition is corrected by detecting density, by said detector, of a predetermined gradation pattern formed by said toner image forming device;
   an information acquisition device configured to acquire information, from an external device, corresponding to a designated mode of an image quality priority mode, in which a first toner image is formed under the image forming condition corrected by the gradation control after a main power switch is turned on, and a speed priority mode, in which the first toner image is formed under a predetermined image forming condition without executing the gradation control after the main power switch is turned on; and
   a controller configured to control said toner image forming device based on the information acquired by said information acquisition device.

6. An apparatus according to claim 5, wherein said toner image forming device includes a photosensitive member, a charging device configured to electrically charge said photosensitive member, an exposure device configured to expose said photosensitive member charged by said charging device, and a developing device configured to develop an electrostatic image on said photosensitive member, and wherein said detector detects density of the gradation pattern formed on said photosensitive member.

7. An apparatus according to claim 5, wherein said toner image forming device includes a photosensitive member, a charging device configured to electrically charge said photosensitive member, an exposure device configured to expose said photosensitive member charged by said charging device, a developing device configured to develop an electrostatic image on said photosensitive member, and an intermediate transfer member configured so that the toner image is transferred from said photosensitive member to said intermediate transfer member and then the toner image is transferred from said intermediate transfer member to the recording material, and wherein said detector detects density of the gradation pattern formed on said intermediate transfer member.

* * * * *